(12) United States Patent
Saigusa

(10) Patent No.: US 12,105,997 B2
(45) Date of Patent: Oct. 1, 2024

(54) INFORMATION PROCESSING APPARATUS, PRINTING APPARATUS, AND METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Hirokazu Saigusa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/157,334

(22) Filed: Jan. 25, 2021

(65) Prior Publication Data
US 2021/0240412 A1    Aug. 5, 2021

(30) Foreign Application Priority Data
Jan. 31, 2020   (JP) .................. 2020-015844

(51) Int. Cl.
     G06F 3/12      (2006.01)
     H04L 67/01      (2022.01)

(52) U.S. Cl.
CPC .......... *G06F 3/1225* (2013.01); *G06F 3/1204* (2013.01); *G06F 3/1231* (2013.01); *G06F 3/1257* (2013.01); *G06F 3/1259* (2013.01); *G06F 3/1287* (2013.01); *H04L 67/01* (2022.05)

(58) Field of Classification Search
None
See application file for complete search history.

(56) References Cited

U.S. PATENT DOCUMENTS

| | | | | |
|---|---|---|---|---|
| 2006/0012835 A1* | 1/2006 | Shimizu | ............... | G06F 3/1288 358/1.18 |
| 2015/0286451 A1* | 10/2015 | Armstrong | ............ | G06F 3/1205 358/1.15 |
| 2019/0339915 A1* | 11/2019 | Saito | ..................... | G06F 3/1207 |
| 2019/0361636 A1* | 11/2019 | Ren | ........................ | G06F 3/1232 |
| 2020/0004477 A1* | 1/2020 | Morita | .................. | G06F 3/1232 |

FOREIGN PATENT DOCUMENTS

| | | |
|---|---|---|
| EP | 1868077 A2 | 12/2007 |
| EP | 3567465 A1 | 11/2019 |
| JP | 2001209509 * | 8/2001 |

(Continued)

*Primary Examiner* — Fan Zhang
(74) *Attorney, Agent, or Firm* — Canon U.S.A., Inc. IP Division

(57) ABSTRACT

An information processing apparatus configured to communicate with a first server system, the first server system being configured to receive a registration request transmitted from a printing apparatus, said registration request corresponding to an operation for registering information in the first server system, includes an identification unit configured to identify application identification information corresponding to model information about the printing apparatus, an obtaining unit configured to obtain an application identified by the application identification information identified from a second server system, a display unit configured to display a print setting screen generated by the obtained application, and a transmission unit configured to transmit a print setting made via the print setting screen to the first server system.

21 Claims, 14 Drawing Sheets

(56) References Cited

FOREIGN PATENT DOCUMENTS

| | | | |
|---|---|---|---|
| JP | 2006031465 A | | 2/2006 |
| JP | 2006155289 A | | 6/2006 |
| JP | 2007241990 A | * | 9/2007 |
| JP | 2013025552 A | | 2/2013 |
| JP | 2013-238924 A | | 11/2013 |
| JP | 2014032454 A | * | 2/2014 |
| JP | 2018198013 A | | 12/2018 |
| JP | 2019167182 A | * | 10/2019 |
| JP | 2019197249 A | | 11/2019 |
| JP | 2019204275 A | | 11/2019 |
| JP | 2020004158 A | | 1/2020 |
| JP | 2020013195 A | | 1/2020 |
| WO | 2013/054644 A1 | | 4/2013 |

* cited by examiner

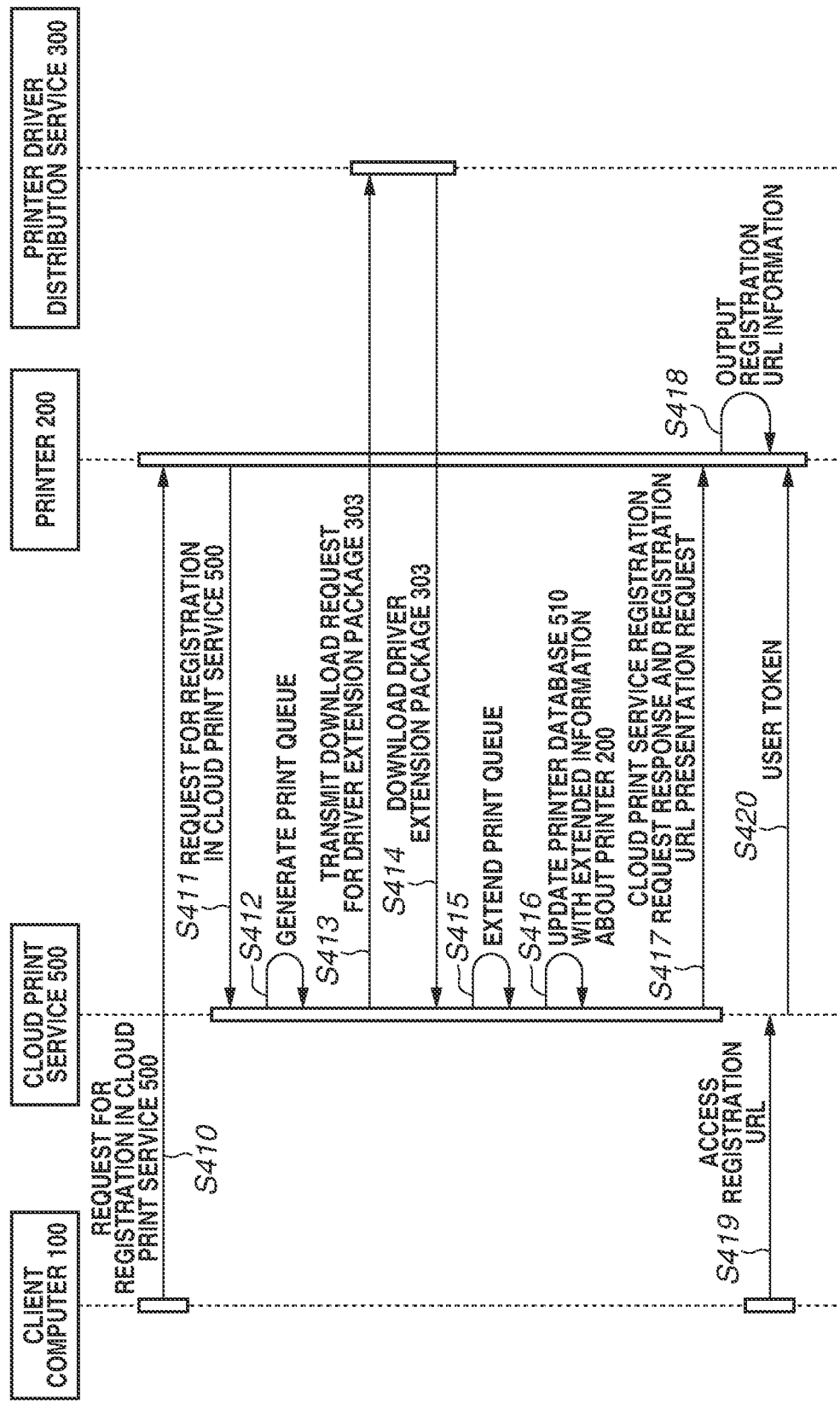

FIG.5A

| DEVICE NAME | HWID | COID | IP ADDRESS | PACKAGE |
|---|---|---|---|---|
| iR-ADV CCCC | iR-ADV_CCCC61B1 | xxyyzz | xxx.xxx.xxx.001 | package C |
| iR-ADV XXXX | iR-ADV_XXXXD80D | xxyyzz | xxx.xxx.xxx.111 | package D |
| AAAA | AAAACF39 | aaabbb | xxx.xxx.xxx.222 | null |
| YYYY | YYYY62B5 | abcabc | xxx.xxx.xxx.234 | null |

FIG.5B

| PACKAGE NAME | HWID | COID | PACKAGE | APPLICATION ID | EXTENSION FLAG |
|---|---|---|---|---|---|
| A-Driver | iR-ADV_CCCC61B2 | xxyyzz | package A | | FALSE |
| B-Driver | iR-ADV_XXXXD81D | xxyyzz | package B | | FALSE |
| C-Driver | iR-ADV_CCCC61B1 | xxyyzz | package C | AAAAA_AA | TRUE |
| D-Driver | iR-ADV_XXXXD80D | xxyyzz | package D | BBBBB_BB | TRUE |

FIG.5C

| APPLICATION NAME | APPLICATION ID | APPLICATION PACKAGE |
|---|---|---|
| A-company App | AAAAA_AA | package AA |
| B-company App | BBBBB_BB | package BB |
| C-company App | CCCCC_CC | package CC |
| D-company App | DDDDD_DD | pakcage DD |

FIG.7

CLOUD PRINT SERVICE

Taro Yamada | UPDATE | NUMBER OF DOCUMENTS: 5

| DOCUMENT NAME | COLOR MODE | TWO-SIDED | N in 1 | NUMBER OF COPIES | DATE/TIME |
|---|---|---|---|---|---|
| ■ aaa.doc | COLOR | ONE-SIDED | 1 in 1 | 1 | 01/14 10:19 |
| ☐ ddd.doc | MONOCHROME | ONE-SIDED | 1 in 1 | 1 | 01/14 10:19 |
| ☐ eee.pdf | MONOCHROME | TWO-SIDED | 1 in 1 | 1 | 01/14 10:19 |
| ☐ hhh.doc | COLOR | ONE-SIDED | 1 in 1 | 1 | 01/14 10:20 |
| ☐ jjj.pdf | MONOCHROME | ONE-SIDED | 1 in 1 | 1 | 01/14 10:20 |

◁ ▷  1/1   ◁◁ ▷▷

SELECT ALL | DESELECT | DELETE    701~ PRINT    ⓘ LOGOUT

FIG.9

```
{
    "Duplex": ["Dupex", "One-Side"],
901 ~ "Color": ["Mono", "Color"],
    "Orientation": ["Portrait", "Landscape"],
    ...
    ...
902 ~ "Extension_Setting1": ["Extension_option1", "Extension_option2"],
    "Extension_Setting2": ["Extension_option1", "Extension_option2"],
}
```

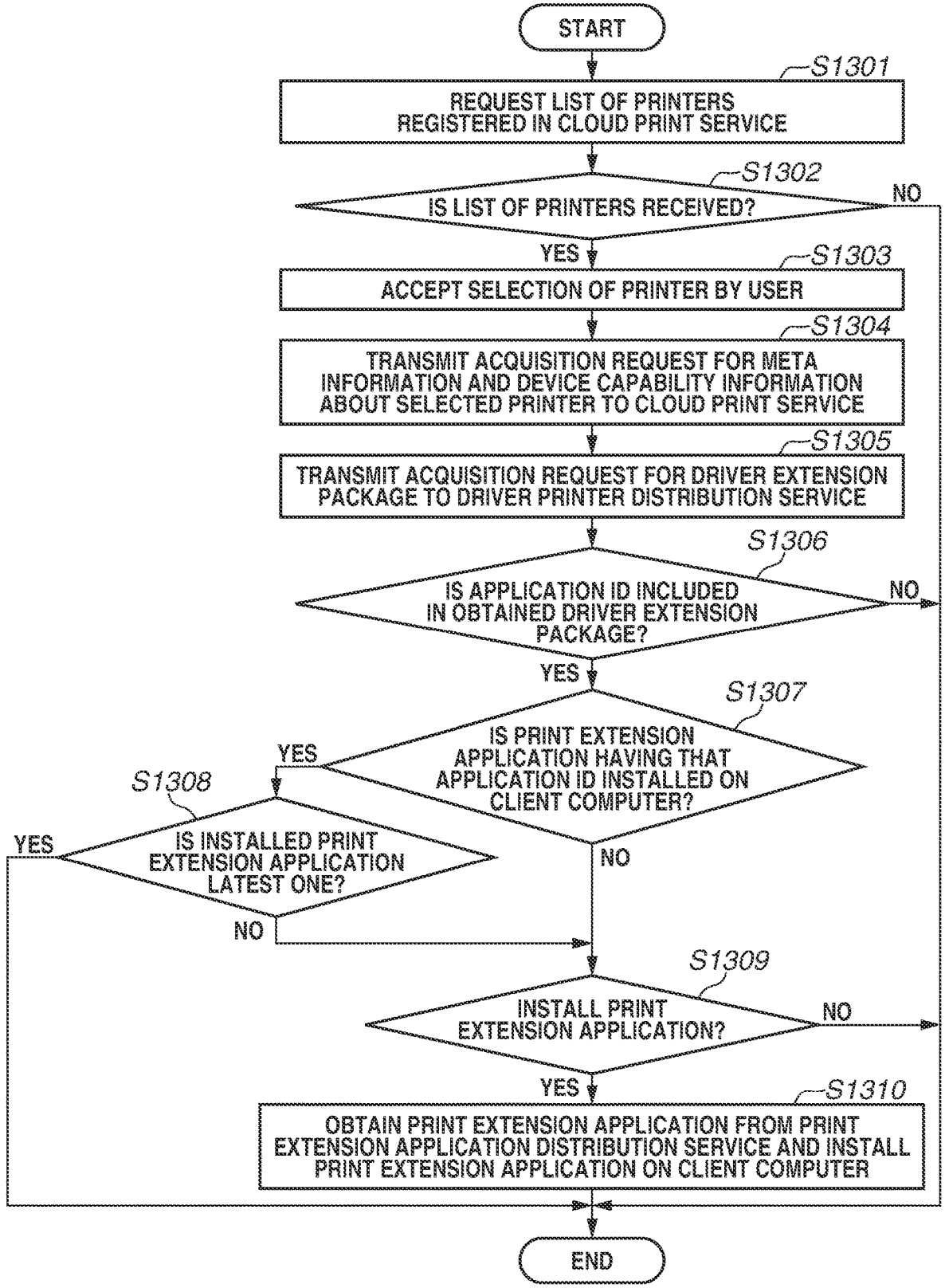

INFORMATION PROCESSING APPARATUS, PRINTING APPARATUS, AND METHOD FOR CONTROLLING INFORMATION PROCESSING APPARATUS, AND STORAGE MEDIUM

BACKGROUND OF THE INVENTION

Field of the Invention

The present invention relates to an information processing apparatus, a printing apparatus that performs printing based on a print setting made by using the information processing apparatus, a method for controlling the information processing apparatus, and a storage medium.

Description of the Related Art

In known printing systems, a user registers information about a printing apparatus in a cloud print service in advance and transmits print data to the printing apparatus via the cloud print service to perform printing. The user accesses the cloud print service from an information processing apparatus, such as a personal computer (PC), selects the printing apparatus to be used for printing from among printing apparatuses registered in the cloud print service, and gives an instruction to print the print data.

The information processing apparatus generates a print job and submits the print job to a print queue on the cloud print service. The printing apparatus accesses the cloud print service, obtains the print job spooled in the print queue generated on the cloud print service, and outputs the print job (Japanese Patent Application Laid-Open No. 2013-238924).

Representative examples of the cloud print service include Google Cloud Print (registered trademark) (Japanese Patent Application Laid-Open No. 2013-238924), Microsoft Hybrid Cloud Print (registered trademark), and uniFLOW Online (registered trademark).

In performing printing using a cloud print service, the user makes print settings on a print setting screen provided by the cloud print service or a print setting screen provided by standard software, such as an operating system (OS). However, in such print setting screens provided by the cloud print service and the OS, only standard setting items can be set.

Attempts have been made to extend the print setting screen provided by the cloud print service or OS by using a print extension application, so that items other than standard setting items can also be set. To use the print extension application, the user searches an application-distributing service for a print extension application corresponding to the printer registered in the cloud print service and installs the print extension application on the client terminal.

SUMMARY OF THE INVENTION

According to an aspect of the present invention, an information processing apparatus configured to communicate with a first server system, the first server system being configured to receive a registration request transmitted from a printing apparatus, said registration request corresponding to a user operation for registering information in the first server system, includes an identification unit configured to identify application identification information corresponding to model information about the printing apparatus, the model information being transmitted to the first server system by the printing apparatus, an obtaining unit configured to obtain an application identified by the application identification information identified by the identification unit from a second server system, a display unit configured to display a print setting screen generated by the obtained application, and a transmission unit configured to transmit a print setting made via the print setting screen to the first server system.

Further features of the present invention will become apparent from the following description of exemplary embodiments with reference to the attached drawings.

BRIEF DESCRIPTION OF THE DRAWINGS

FIG. 4 is a diagram illustrating an example of a sequence for registering a printer in the cloud print service according to the present exemplary embodiment.

FIG. 5A is a diagram illustrating an example of a printer database stored in the cloud print service according to the present exemplary embodiment. FIG. 5B is a diagram illustrating an example of a printer driver database stored in the printer driver distribution service according to the present exemplary embodiment. FIG. 5C is a diagram illustrating an example of an application database stored in the print extension application distribution service according to the present exemplary embodiment.

FIG. 7 is a diagram illustrating an example of an operation panel displaying a printable job list received from the cloud print service according to the present exemplary embodiment.

FIG. 9 is a diagram illustrating an example of extended print settings according to the present exemplary embodiment.

FIG. 13 is a flowchart illustrating processing for installing the print extension application according to the present exemplary embodiment.

DESCRIPTION OF THE EMBODIMENTS

Figure 1:
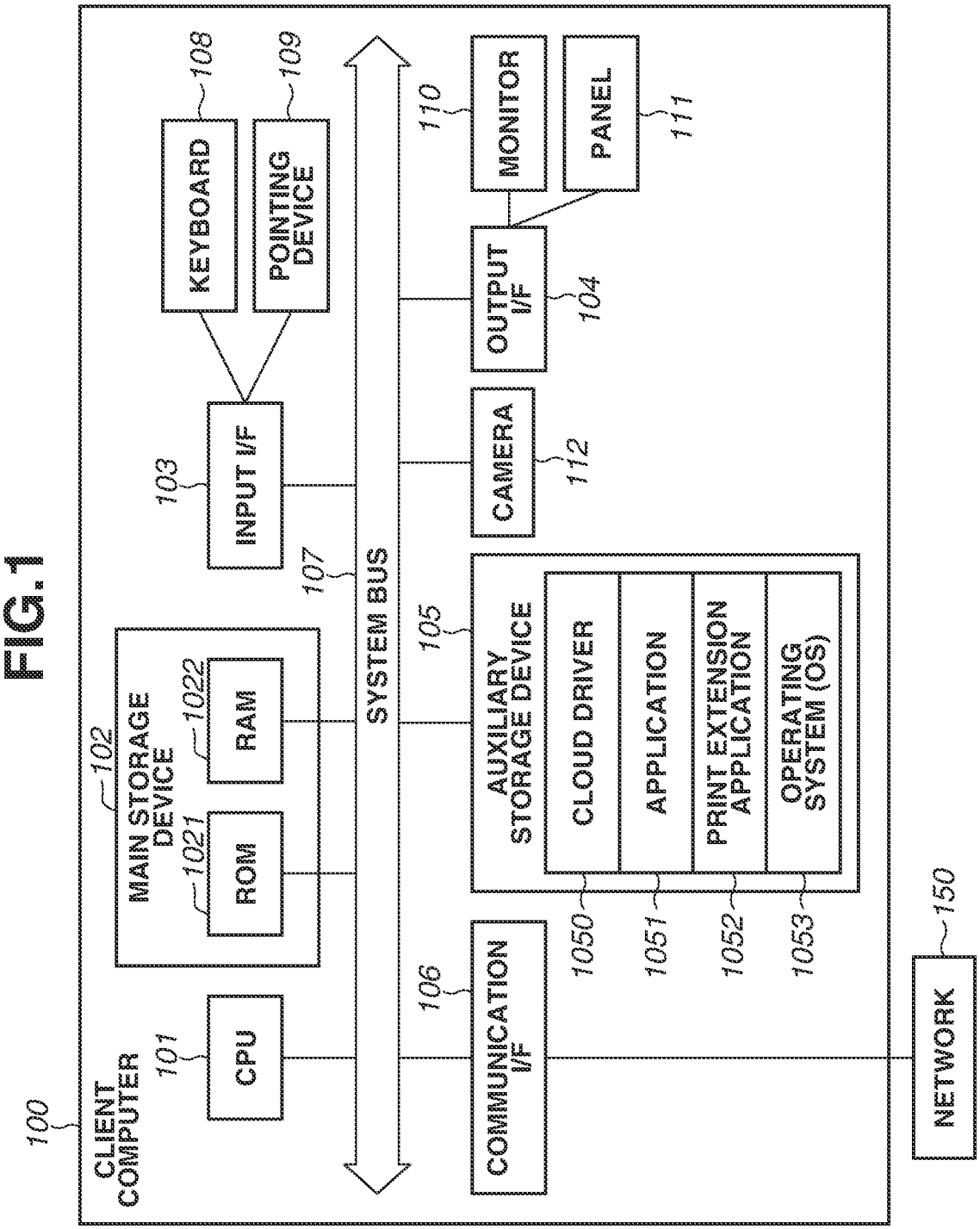
FIG. 1 is a diagram illustrating an example of a hardware configuration of a client computer according to an exemplary embodiment.

FIG. 1 is a hardware configuration diagram of a client computer (information processing apparatus) 100 using a cloud print service according to the present exemplary embodiment. A detailed description will be provided below.

A central processing unit (CPU) 101 controls the entire apparatus based on a program stored in a read-only memory (ROM) 1021 or a random access memory (RAM) 1022 of a main storage device 102, or an auxiliary storage device 105.

The RAM 1022 is also used as a work area when the CPU 101 performs various types of processing. A cloud driver 1050, an operating system (OS) 1053, an application 1051, and a print extension application 1052 are recorded in the auxiliary storage device 105. In the following description, the main storage device 102 and the auxiliary storage device 105 will be referred to collectively as a storage device.

Input devices such as a pointing device 109 and a keyboard 108, typified by a mouse and a touch panel, are connected to a system bus 107 via an input interface (I/F) 103. The input devices are intended for the user to give various instructions to the client computer 100.

An output I/F 104 is an I/F for outputting data to outside. The output I/F 104 output data to output devices such as a monitor 110 and a panel (operation panel) 111. The client computer 100 also has an imaging function and includes a camera 112.

The client computer 100 is connected to a printer 200 and various systems to be described below in conjunction with FIG. 2 via a communication I/F 106 and over a network 150. The system bus 107 is a common data system bus, and exchanges data between the I/Fs and modules.

Figure 2:
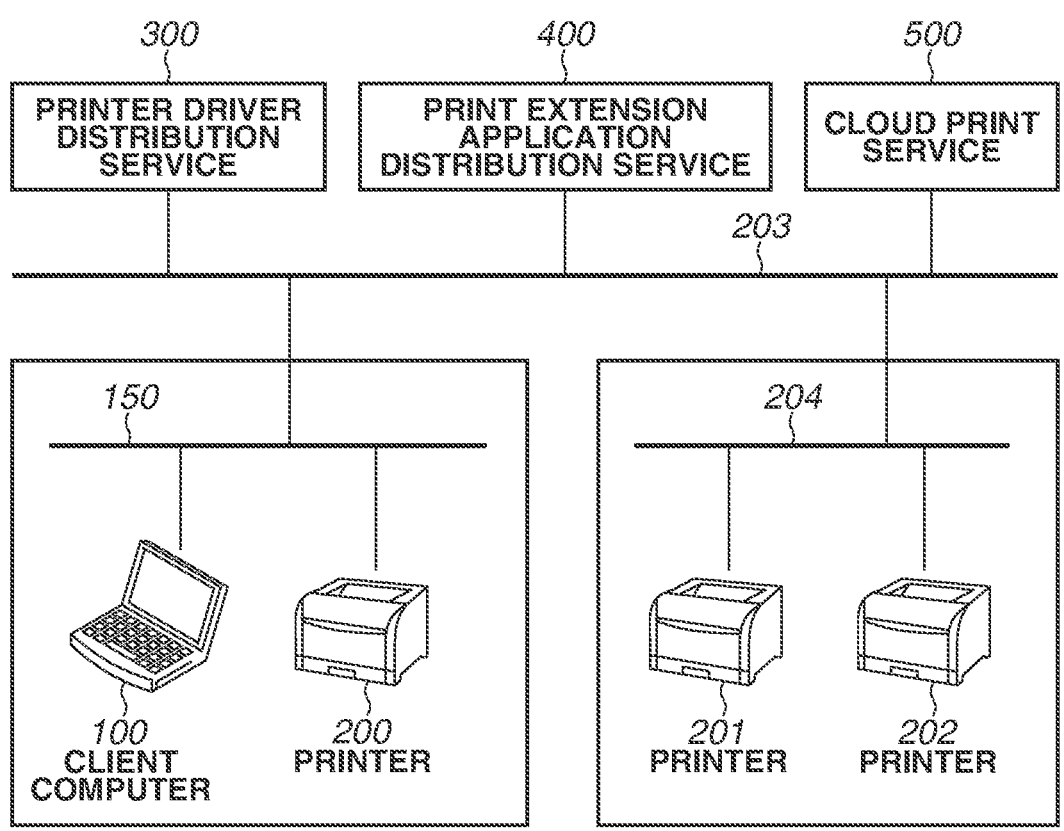
FIG. 2 is a diagram illustrating an example of a network configuration according to the present exemplary embodiment.

FIG. 2 is a schematic diagram of a printing system, illustrating a simplified network environment according to the present exemplary embodiment.

The client computer 100 and the printer 200 are connected to the network 150. The client computer 100 and the printer 200 are connected to the same intranet and can communicate with each other.

A printer 201 and a printer 202 are connected to another intranet 204. The network 150 is connected to the intranet 204 via the Internet 203. A printer driver distribution service 300, a print extension application distribution service 400, and a cloud print service 500 are connected to the Internet 203.

The printer driver distribution service 300 is a server system including one or a plurality of information processing apparatuses that provides a service for distributing printer drivers to the client computer 100 in a web-based fashion. The client computer 100 searches for the printer 200 by using a protocol, such as Web Services for Devices (WSD) and the Internet Printing Protocol (IPP). The client computer 100 obtains a printer driver based on printer identification information and model information about the found printer 200 from the printer driver distribution service 300, and installs the printer driver. The printer driver registered in the printer driver distribution service 300 is updated by the printer vendor. The client computer 100 automatically or manually obtains a new version of the printer driver from the printer driver distribution service 300, and updates the installed printer driver.

The print extension application distribution service 400 is a server system including one or a plurality of information processing apparatuses that provides a service for distributing a print extension application to be executed by the client computer 100. The print extension application is an application for extending the print functions provided by the cloud print service 500 and the OS 1053. In the print functions provided by the cloud print service 500 and the OS 1053, only standard print settings that are usable by printers of any vendors can be made. Examples of the standard print settings include a color mode setting and a two-sided printing setting. The print extension application can be used to enable print functions of which settings are unable to be made by the print functions provided by the cloud print service 500 or the OS 1053. Examples of such print functions include a needleless stapling function, a poster printing function, and a saddle stitch bookbinding function.

If a user operation for requesting installation of the print extension application is received, the client computer 100 accesses the print extension application distribution service 400 and installs the print extension application. The print extension application is also installed if an application identifier is described in an information (INF) file of the printer driver installed on the client computer 100. An application identifier is application identification information for identifying a print extension application corresponding to a printer registered in the cloud print service 500 among print extension applications registered in the print extension application distribution service 400. The client computer 100 accesses the print extension application distribution service 400 and installs the print extension application corresponding to the application identifier described in the INF file.

The cloud print service 500 is a service constructed in a cloud computing environment that is a server system including one or a plurality of information processing apparatuses. In the present exemplary embodiment, the cloud print service 500 can be connected with the intranets, and can be connected with the client computer 100 and the printers 200, 201, and 202 via the Internet 203. The cloud print service 500 manages accounts by using user identifiers (IDs) and passwords. The client computer 100 accesses the cloud print service 500 by using account information input by the user.

In the present exemplary embodiment, the client computer 100 stores the Uniform Resource Locators (URLs) of the cloud print service 500 and the print extension application distribution service 400 in advance. The cloud print service 500 stores the URL of the printer driver distribution service 300 in advance.

Figure 3A:
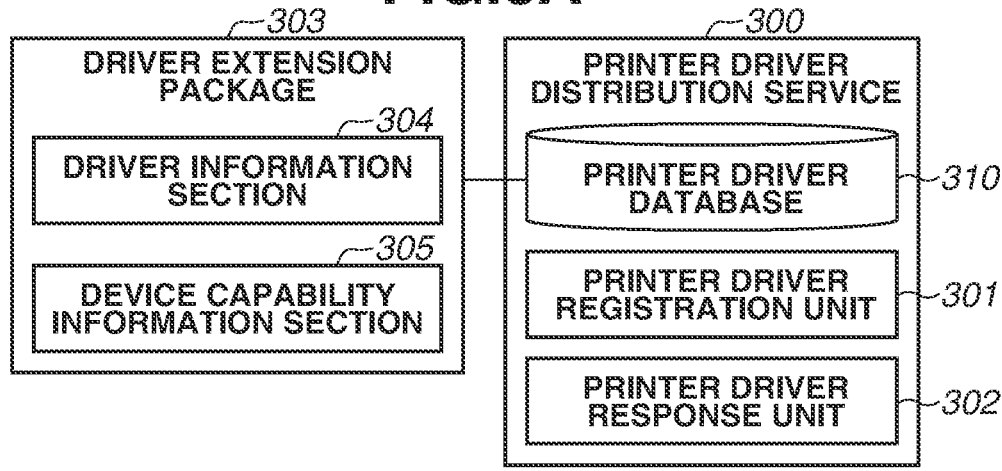
FIG. 3A is a diagram illustrating an example of functional blocks of a printer driver distribution service according to the present exemplary embodiment.

FIG. 3A is a diagram illustrating an example of functional blocks of the printer driver distribution service 300. The printer driver distribution service 300 is a server system including one or a plurality of information processing apparatuses having a configuration similar to that of the information processing apparatus (client computer 100) illustrated in FIG. 1. A printer driver registration unit 301 and a printer driver response unit 302 are implemented by execution of programs by the CPU(s) of the information processing apparatus(es) constituting the printer driver distribution service 300.

The printer driver distribution service 300 is a service existing in a cloud computing environment via the Internet 203. The printer driver distribution service 300 can distribute printer driver-related packages to external services and the client computer 100. Examples of the printer driver-related packages include a printer driver and a driver extension package.

When a registration instruction to register a printer driver-related package is provided from an external service or the client computer 100, the printer driver registration unit 301 registers the uploaded package in a printer driver database 310. For example, the printer driver registration unit 301 registers printer drivers distributed by printer vendors and driver extension packages for extending the printer drivers in the printer driver database 310.

If an acquisition request for a printer driver or a driver extension package is provided from an external service or the client computer 100, the printer driver response unit 302 obtains the corresponding package from the printer driver database 310 and responds with the package. For example, suppose that a request for a printer driver corresponding to the printer 200 of which a print queue is generated is received from the client computer 100. The printer driver response unit 302 reads the printer driver corresponding to the printer 200 from the printer driver database 310, and transmits the printer driver to the client computer 100. The printer driver response unit 302 can also receive an acquisition request for a driver extension package for extending the installed printer driver from the client computer 100. In such a case, the printer driver response unit 302 reads the driver extension package corresponding to the requested printer driver from the printer driver database 310, and transmits the driver extension package to the client computer 100.

The printer driver database 310 stores information to be described below in conjunction with FIG. 5B. The printer driver database 310 also stores a driver extension package 303 in addition to printer drivers corresponding to various printers.

The driver extension package 303 is an example of a package to be distributed by the printer driver distribution service 300. The driver extension package 303 includes a driver information section 304 and a device capability information section 305. The driver information section 304 includes a hardware ID (HWID) for identifying a printer, a compatible ID (COID), information indicating that this package is a driver extension package, and information about the version of the driver extension package 303. The device capability information section 305 includes device capability information and conflict information about the corresponding printer 200. Examples of the device capability information include information about whether the printer 200 supports color printing and whether the printer 200 supports two-sided printing. In addition to such capability information, the device capability information included in the driver extension package 303 also includes information about whether vendor-specific needleless stapling is supported, whether saddle stitch bookbinding is supported, and whether mixed sheet printing for performing printing using a plurality of types of sheets is supported.

Figure 3B:
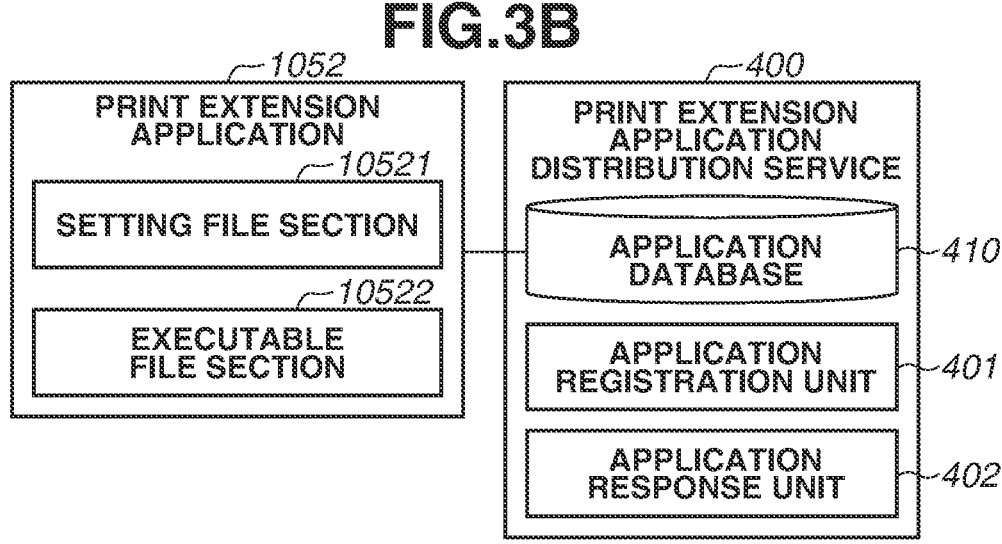
FIG. 3B is a diagram illustrating an example of functional blocks of a print extension application distribution service according to the present exemplary embodiment.

FIG. 3B is a diagram illustrating an example of functional blocks of the print extension application distribution service 400. An application registration unit 401 and an application response unit 402 are implemented by execution of programs by the CPU(s) of one or a plurality of information processing apparatuses constituting the print extension application distribution service 400.

The print extension application distribution service 400 is a service existing in a cloud computing environment via the Internet 203. The print extension application distribution service 400 can distribute print extension applications to external services and the client computer 100. The print extension application distribution service 400 is not limited to the print extension application 1052 and may be able to distribute other applications.

When a registration instruction to register the print extension application 1052 is provided from an external service or the client computer 100, the application registration unit 401 registers the uploaded application in an application database 410.

If an acquisition request for the print extension application 1052 is provided from an external service or the client computer 100, the application response unit 402 obtains the corresponding application from the application database 410 and transmits the application to the requestor.

The application database 410 is a database in which information about print setting applications that are distributed by vendors and for which registration requests are received from the external services and the client computer 100 is registered. Details of the information registered in the application database 410 will be described below with reference to FIG. 5C.

The print extension application 1052 according to the present exemplary embodiment includes a setting file section 10521 and an executable file section 10522. The setting file section 10521 includes application identification information for identifying the print extension application 1052, and information such as an HWID and a COID for identifying the corresponding printer 200. The executable file section 10522 is the executable file section of the print extension application 1052. The executable file section 10522 can receive a push notification from a print setting user interface (UI) or an external service, and display a print setting screen.

Figure 3C:
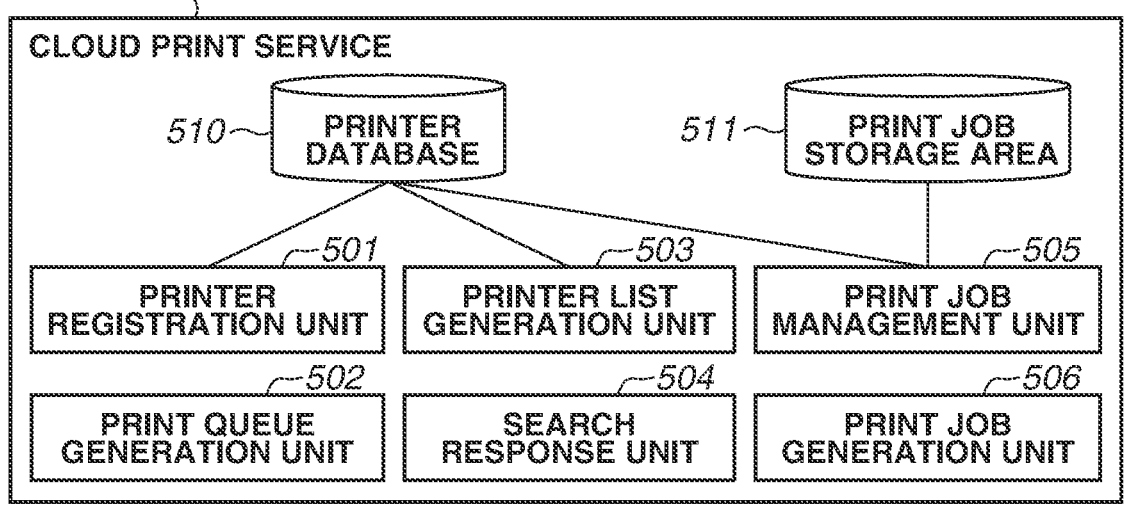
FIG. 3C is a diagram illustrating an example of functional blocks of a cloud print service according to the present exemplary embodiment.

FIG. 3C is a functional block diagram of the cloud print service 500 according to the present exemplary embodiment. The functional blocks are implemented by execution of programs by the CPU(s) of one or a plurality of information processing apparatuses constituting the cloud print service 500.

The cloud print service 500 is a service existing in a cloud computing environment via the Internet 203 and can provide printing-related functions. In the present exemplary embodiment, the cloud print service 500 includes the functions of a printer registration unit 501, a print queue generation unit 502, a printer list generation unit 503, a search response unit 504, and a printer database 510. The cloud print service 500 further includes the functions of a print job management unit 505, a print job generation unit 506, and a print job storage area 511. Such functions may be included in another cloud print service cooperating with the cloud print service 500.

Now, a case where the printer 200 is registered into the cloud print service 500 and printing is performed by using the printer 200 will be described as an example. However, similar processing can be implemented with the printers 201 and 202 connectable to the cloud print service 500.

If a printer registration instruction is provided from the printer 200, the printer registration unit 501 generates a print queue by using the print queue generation unit 502, and registers the generated print queue in the printer database 510 in association with printer identification information. That the print queue and printer identification information assigned to a printer and are thus registered in association with each other will be referred to as the printer being registered. Various attributes can be added to the registered printer. Examples of the various attributes include the location of the printer.

The print queue generation unit 502 generates a print queue on the cloud print service 500 under the control of the printer registration unit 501. If the client computer 100 transmits a print instruction to the cloud print service 500, a print job is registered in the print queue generated by the print queue generation unit 502.

The printer list generation unit 503 generates a list of registered printers. The printer list generation unit 503 generates a list of printers registered in the cloud print service 500 if the list of printers is requested by the client computer 100.

The search response unit 504 responds to the client computer 100 with information about the registered printers based on a printer search made with respect to the cloud print service 500 by the client computer 100. The search response unit 504 passes a search result to the printer list generation unit 503 to cause the printer list generation unit 203 to generate a printer list. The search response unit 504 then returns the printer list generated by the printer list generation unit 503 to the client computer 100.

The print job management unit 505 receives image data and print settings from the client computer 100, and transmits a print job generated by the print job generation unit 506 to the printer 200. The print job management unit 505 also stores the print job generated by the print job generation unit 506 into the print job storage area 511.

The printer database 510 is a database storing information about the printers registered in the cloud print service 500. The contents stored in the printer database 510 will be described below with reference to FIG. 5A.

Processing for registering the printer 200 in the cloud print service 500 will initially be described.

FIG. 4 is a sequence diagram of the processing for registering the printer 200 in the cloud print service 500 according to the present exemplary embodiment. In the present exemplary embodiment, the client computer 100 accesses the printer 200 and operates the printer 200 to transmit a registration request for registration of the printer 200 to the cloud print service 500.

The printer 200 supports a cloud print function (function of receiving a print job from the cloud print service 500 and printing the print job) and a web UI function for operating the printer 200 from the client computer 100. The web UI function is a function of generating a UI and publishing the UI on a network (hereinafter, such a UI will be referred to as a web UI). The client computer 100 supports a cloud print client function (function of transmitting a file to the cloud print service 500) and a web UI client (such as a web browser) for operating the web UI. The cloud print service 500 represents a cloud print service on the Internet 203.

The user initially opens the web UI of the printer 200 by using the web UI client on the client computer 100, and selects a button for registering the printer 200 in the cloud print service 500 on the web UI. If the selection is made, then in step S410, the client computer 100 transmits a request for registration in the cloud print service 500 to the printer 200.

In step S411, in response to receiving the request for registration in the cloud print service 500 in step S410, the printer 200 transmits the request for registration in the cloud print service 500 to the cloud print service 500. In the present exemplary embodiment, the request for registration of the printer 200 in the cloud print service 500 is thus transmitted from the web UI client on the client computer 100. Alternatively, the request may be transmitted by operating an input device accompanying the printer 200, such as the operation panel 111. In such a case, the printer 200 transmits the request for registration of the printer 200 to the cloud print service 500 without a request from the client computer 100.

The request for registration in the cloud print service 500 that is transmitted to the cloud print service 500 in step S411 is accompanied by information about the printer 200. The information about the printer 200 includes the name of the printer 200, information (HWID) for identifying the model of the printer 200, and a COID for identifying a printer type, such as an inkjet printer and a laser printer. The information about the printer 200 further includes Internet Protocol (IP) address information and a capability information file related to the functions standardized by the IPP.

In step S412, in response to receiving the registration request in step S411, the cloud print service 500 causes the print queue generation unit 502 to generate a print queue for transmitting a print job to the printer 200. Specifically, the printer registration unit 501 registers the information about the printer 200 and device capability information into the printer database 510, and generates a record of the registration-requested printer 200. The print queue generation unit 502 then generates a print queue. The print queue is generated by using the received information about the printer 200, namely, the name (device name) of the printer 200, the HWID for identifying the model of the printer 200, the COID, and the IP address of the printer 200.

In step S413, the cloud print service 500 transmits a download request for downloading of the driver extension package 303 to the printer driver distribution service 300. This request is intended to receive the driver extension package 303 corresponding to the printer 200 registered in the cloud print service 500. The cloud print service 500 transmits the download request for the downloading of the driver extension package 303 and the HWID and COID of the printer 200 to the printer driver distribution service 300.

In step S414, the printer driver distribution service 300 transmits the corresponding driver extension package 303 to the cloud print service 500 based on the received HWID and COID. The printer driver distribution service 300 identifies a driver extension package 303 of which an extension flag is TRUE and that matches the received HWID in the printer driver database 310 illustrated in FIG. 5B. If no driver extension package 303 of which the extension flag is TRUE and that matches the received HWID is identified, the printer driver distribution service 300 identifies a driver extension package 303 of which the extension flag is TRUE and that matches the received COID. The printer driver distribution service 300 then transmits the identified driver extension package 303 to the cloud print service 500. If the driver extension package 303 can be identified by the HWID alone, then in step S413, the cloud print service 500 may transmit only the HWID to the printer driver distribution service 300.

FIG. 5B illustrates an example of the printer driver database 310 stored in the printer driver distribution service 300. A package name refers to the name of the package obtained from the driver information section 304 upon registration. An HWID refers to the identification information (model-specific identification information) to be used in identifying the model of the printer 200. A COID is identification information for identifying the category of the printer using this driver. A package refers to the name of the package including a driver extension package 303. The package may refer to any information from which the driver or the driver extension package 303 corresponding to the record can be identified. Examples include a file path. An extension flag indicates whether the package is a driver extension package 303. If the extension flag is "FALSE", the package is not a driver extension package 303 but a printer driver. On the other hand, if the extension flag is "TRUE", the package is not a printer driver but a driver extension package 303. An application ID is identification information about the application to be used in extending a print setting screen by using device capability information stored by the printer extension package. While in the present exemplary embodiment, only driver extension packages 303 have application IDs, printer drivers may also have application IDs.

The printer driver database 310 illustrated in FIG. 5B is updated by the printer driver registration unit 301. The printer driver registration unit 301 analyzes the driver information section 304 in registering a package in the printer driver database 310. The printer driver registration unit 301 obtains the package name, the HWID, the COID, and the information about whether the package is a driver extension package 303, and registers such information in the printer driver database 310 along with the package.

In step S415, the cloud print service 500 analyzes the device capability information section 305 of the downloaded driver extension package 303, and extends the print queue. The cloud print service 500 obtains the device capability information about the printer 200 from the device capability information section 305 of the driver extension package 303. The cloud print service 500 then updates the device capability information about the printer 200 corresponding to the print queue in the printer information registered in the printer database 510. In step S415, the cloud print service 500 rewrites the device capability information corresponding to the print queue with that obtained from the driver extension package 303. Here, among the pieces of device capability information obtained from the driver extension package 303, the cloud print service 500 may add capability information about setting items not associated with the print queue to the device capability information corresponding to the print queue. Alternatively, the cloud print service 500 may obtain information indicating the hardware configuration (hardware configuration information) of the printer 200 from the printer 200, and determine the device capability information based on the device capability information included in the driver extension package 303 and the hardware configuration information.

Through the foregoing processing, the print queue of the printer 200 registered in the cloud print service 500 is extended with vendor-specific device capability information. In step S416, the cloud print service 500 updates the printer database 510 with the extended information about the printer 200. Through such processing, the device capability information extended by the driver extension package 303 is registered into the printer database 510 as the device capability information corresponding to the print queue.

FIG. 5A illustrates an example of the printer database 510 stored in the cloud print service 500. A device name refers to the name of the printer (device name) obtained from the printer 200 upon registration. An HWID refers to the ID (model-specific ID) to be used in identifying the model of the printer 200. A COID is identification information for identifying the category of the printer 200, such as whether the printer 200 is an inkjet printer or a laser beam printer. An IP address refers to the IP address of the printer 200 to be connected. A package refers to the package name of the driver extension package 303 used in extending the print queue corresponding to the printer 200. If the print queue is not extended, the package is "null". Although not illustrated in the diagram, the device capability information is registered in the printer database 510 in a JavaScript (registered trademark) Object Notation (JSON) format. If the device capability information about the printer 200 is extended by the driver extension package 303, the extended device capability information is stored here. The storage format of the device capability information is not limited to the JSON format, and other data formats may be used. The printer database 510 illustrated in FIG. 5A may be configured to store the information about the printer 200 and information about the user who can use the printer 200 in association with each other.

FIG. 9 illustrates an example of the device capability information stored in association with the print queue. The device capability information is in the JSON format, for example, and the setting items represent respective functions. Each function includes settable options in an array form.

Standard capability information 901 defined by the IPP includes the following setting items. A setting item "Duplex" relates to a two-sided printing function, and includes options "Duplex" representing two-sided printing and "One-Sided" representing one-sided printing. A setting item "Color" relates to color printing, and includes options "Mono" representing monochrome printing and "Color" representing color printing. A setting item "Orientation" relates to the orientation of sheets used in printing, and includes options "Portrait" representing a vertically long orientation and "Landscape" representing a horizontally long orientation. The capability information 901 describes standard setting items and options that are defined by the IPP and can be provided from the printer 200 to the cloud print service 500. If the device capability information is extended by using the driver extension package 303, even the standard setting items defined by the IPP, described in the capability information 901, can be extended to include vendor-specific options. For example, a setting item "Staple" related to sheet binding can be extended to accommodate a setting "Saddle Stitch" representing saddle stitching in addition to a standard option "Staple left top" representing binding at a left top position.

Capability information 902 extended by the driver extension package 303 relates to vendor-specific setting items, for example. The capability information 902 includes setting items Extension_Setting1 and Extension_Setting2, each including options Extension_option1 and Extension_option2. Examples of the setting items Extension_Setting include one related to needleless stapling and one related to a mixed sheet function for using a combination of a plurality of types of sheets in a job. In the case of the mixed sheet function, the setting item "Extension_Setting1" includes a character string representing the mixed sheet function. The option "Extension_option1" includes a character string representing the use of A3 and A4 sheets, for example, the option "Extension_option2", and a character string representing the use of B4 and B5 sheets. By referring to the file illustrated in FIG. 9, the print extension application 1052 can provide a print setting screen where the vendor-specific setting items can be set.

Return to FIG. 4. In step S417, the cloud print service 500 that has completed the registration in the printer database 510 transmits a cloud print service registration request response and a registration URL presentation request to the printer 200. The cloud print service registration request response includes a registration URL intended for cloud print registration.

In step S418, the printer 200 receives the cloud print service registration request response and the registration URL presentation request, and outputs registration URL information. In step S418, the printer 200 notifies the user of the registration URL by displaying the registration URL on the monitor 110 or printing the registration URL information on a sheet. The printer 200 may notify the client computer 100 of the registration URL via the web UI.

In step S419, the user accesses the cloud print service 500 located at the registration URL presented by the printer 200.

In so doing, the user inputs the user ID and password to log in to the cloud account in which the cloud print service 500 can be accessed.

The cloud print service 500 associates the user with the printer 200 based on the cloud account and the registration URL including printer information. For example, the user and the printer 200 can be associated by associating the printer information with a user token. However, such a method is not restrictive. In step S420, the cloud print service 500 transmits a user token including information about the cloud print service 500 to the printer 200. The processing for registering the printer 200 in the cloud print service 500 ends. The printer 200 subsequently accesses the cloud print service 500 by using the user token.

Next, processing for generating a print queue of the printer 200 registered in the cloud print service 500 in the client computer 100 and installing the print extension application 1052 will be described.

Figure 6:
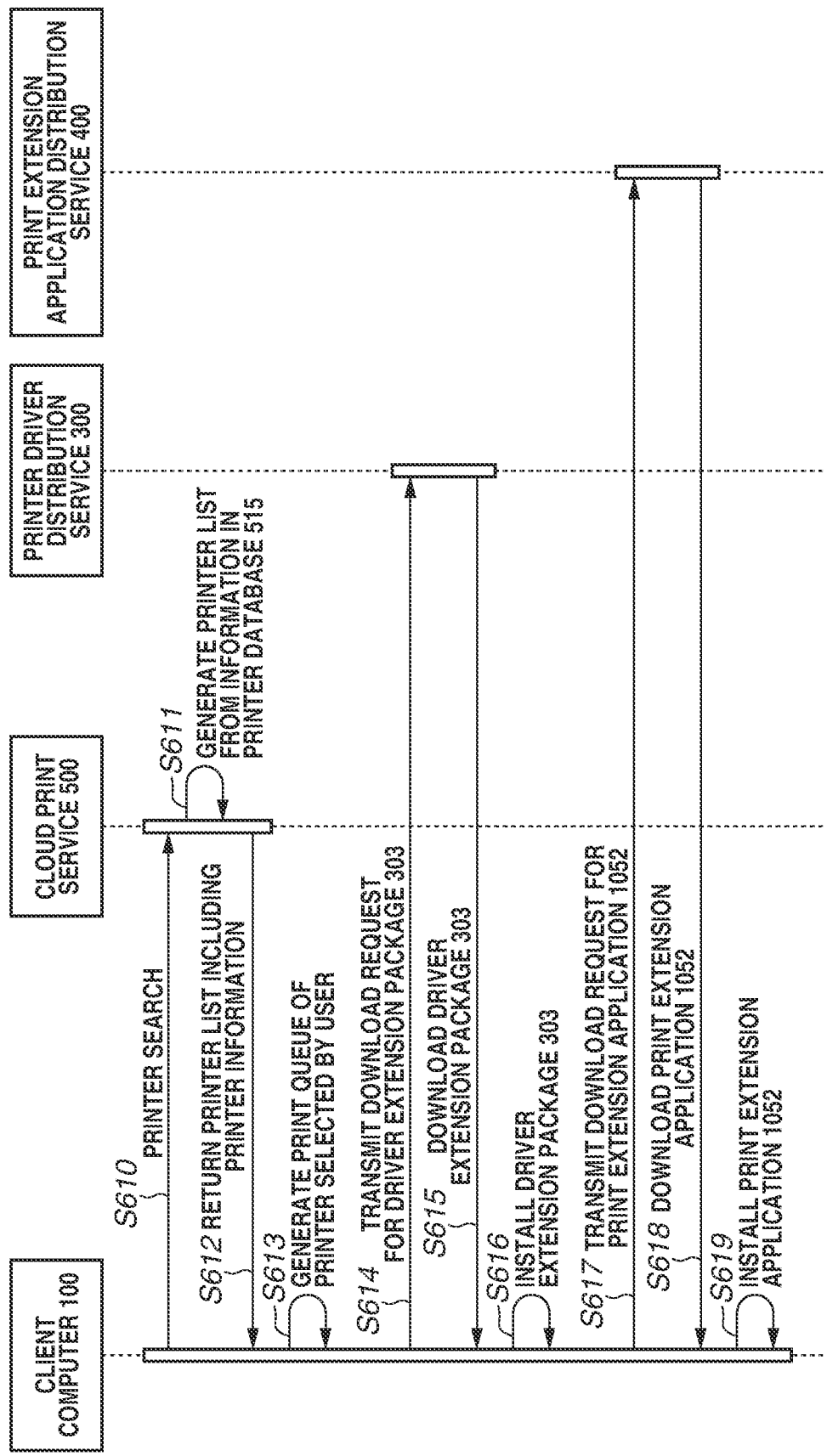
FIG. 6 is a diagram illustrating an example of a sequence for installing a print extension application on the client computer according to the present exemplary embodiment.

FIG. 6 is a sequence diagram of the processing for installing the print extension application 1052 on the client computer 100 according to the present exemplary embodiment.

If the client computer 100 outputs a print job to the printer 200 by using cloud printing, the client computer 100 transmits the print job to the cloud print service 500. For that purpose, a print queue for transmitting the print job to the cloud print service 500 is to be generated on the client computer 100.

In the present exemplary embodiment, the print queue of a printer registered in the cloud print service 500 is generated by using a printer search function that is a standard function of the OS 1053. A printer search usually covers printers on the same intranet. For example, in FIG. 2, the client computer 100 can find the printer 200 by a printer search but not the printer 201 or the printer 202 outside the intranet. In the present exemplary embodiment, the client computer 100 can access the cloud print service 500. The client computer 100 can thus find printers registered in the cloud print service 500, if any, by a printer search. In the present exemplary embodiment, the printers 201 and 202 are registered in the cloud print service 500 in addition to the foregoing printer 200. The client computer 100 can thus also find the printers 201 and 202 with the printer search function of the OS 1053.

In step S610, the client computer 100 performs a printer search, which is the foregoing standard function of the OS 1053. In step S610, the client computer 100 searches for printers registered in the cloud print service 500 in addition to ones on the same intranet. The client computer 100 accesses the cloud print service 500 and transmits a list request for printer information registered in the cloud print service 500 to the cloud print service 500.

In response to the search response unit 504 of the cloud print service 500 receiving the list request, the search response unit 504 presents usable printers to the client computer 100. For that purpose, in step S611, the cloud print service 500 generates a printer list including printer information usable by the user accessing the cloud print service 500 from the client computer 100. The printer information includes the names (device names) of the printers, the HWIDs for identifying the models of the printers, and the IP addresses of the printers. The printer list including the printer information is generated by the printer list generation unit 503 of the cloud print service 500, using the information in the printer database 510.

In step S612, the cloud print service 500 returns the generated printer list to the client computer 100. Here, as the printer information included in the printer list, the cloud print service 500 also transmits information such as HWIDs and COIDs which are printer identification information illustrated in FIG. 5A. The client computer 100 displays a selection screen for selecting a printer usable by the user on the monitor 110 based on the printer list. The user selects the printer 200 to be used from a list of printers presented.

In step S613, the OS 1053 of the client computer 100 installs the cloud driver 1050 used for the cloud print service 500, and generates a print queue of the selected printer. The client computer 100 obtains information about the printer 200 selected by the user from the cloud print service 500, and generates the print queue by using the information. The client computer 100 generates the print queue based on the HWID, COID, IP address, and device capability information of the printer 200 obtained from the cloud print service 500. If the cloud driver 1050 has already been installed on the client computer 100, the client computer 100 does not install the cloud driver 1050. In such a case, the client computer 100 generates the print queue by using the already-installed cloud driver and the information about the printer 200 obtained from the cloud print service 500.

If the print queue is successfully generated, then in step S614, the OS 1053 of the client computer 100 issues a download request for downloading of the driver extension package 303 to the printer driver distribution service 300. The client computer 100 transmits the HWID, the COID, and an acquisition request for the driver extension package 303 to the cloud print service 500. The client computer 100 may transmit only either one of the HWID and COID to the cloud print service 500.

In step S615, in response to receiving the download request, the printer driver distribution service 300 performs download processing on the client computer 100. The printer driver distribution service 300 identifies a driver extension package 303 matching the received HWID among those registered in the printer driver database 310, and transmits the identified driver extension package 303 to the client computer 100. If there is no driver extension package 303 matching the received HWID among those registered in the printer driver database 310, the printer driver distribution service 300 identifies a driver extension package 303 matching the received COID. The printer driver distribution service 300 then transmits the identified printer extension package 303 to the client computer 100.

In step S616, the OS 1053 of the client computer 100 installs the driver extension package 303, and extends the capability information associated with the print queue generated based on the cloud driver 1050. The client computer 100 updates the capability information corresponding to the print queue with the device capability information included in the driver extension package 303. In other words, the client computer 100 extends the print queue of the printer 200 registered in the cloud print service 500 with vendor-specific device capability information. If no device capability information has been obtained from the cloud print service 500, the client computer 100 extends the print queue by associating the print queue with the device capability information included in the driver extension package 303. If device capability information has been obtained from the cloud print service 500, the client computer 100 extends the print queue by overwriting the device capability information obtained from the cloud print service 500 with the device capability information included in the driver extension package 303. If device capability information has been obtained from the cloud print service 500, the client computer 100 may extend the print queue by adding device capability information that is included in the driver extension package 303 and not included in the device capability information obtained from the cloud print service 500. The client computer 100 may further extend the print queue by registering functions executable by the printer 200 as device capability information based on the foregoing device capability information and the hardware configuration information about the printer 200.

In step S617, the client computer 100 transmits a download request to the print extension application distribution service 400. Here, the OS 1053 issues a download request for downloading of the print extension application 1052 associated with the target printer 200 based on ID information (application ID) about the print extension application 1052. In the present exemplary embodiment, the print extension application distribution service 400 stores the ID information about the print extension application 1052 specified by driver extension package 303 and the print extension application 1052 in association with each other on a one-on-one basis.

The print extension application distribution service 400 may store metadata describing association information about between the ID information assigned to the print extension application 1052 and the HWID included in the printer information. In such a case, an appropriate print extension application 1052 is downloaded by using the metadata.

In step S618, in response to receiving the download request, the print extension application distribution service 400 performs download processing on the client computer 100. The application response unit 402 identifies print extension application 1052 corresponding to the application ID notified by the client computer 100 from the application database 410 illustrated in FIG. 5C. The application response unit 402 transmits the identified print extension application 1052 to the client computer 100. In step S619, the client computer 100 installs the print extension application 1052.

FIG. 5C illustrates an example of the application database 410 stored in the print extension application distribution service 400. An application name lists the names of print extension applications registered in the application database 410, including the print extension application 1052. An application ID lists information for identifying the print extension applications including the print extension application 1052. An application package lists file paths where the print extension applications including the print extension application 1052 are stored. The application package may list any information from which the packages of the registered print extension applications can be identified. Examples include the folder names of folders where the print extension applications are stored.

The application database 410 is updated by the application registration unit 401. The application registration unit 401 analyzes the setting file section 10521 and obtains the application name and the application ID. The application registration unit 401 registers the information in the application database 410 along with the print extension application 1052.

After the installation, the print extension application 1052 on the client computer 100 is associated with the printer 200 on a one-on-one basis. Since the printer 200 stores the model information and print setting information about the printer 200, the print extension application 1052 can present an appropriate print setting UI to the user. Alternatively, the print extension application 1052 may communicate with the cloud print service 500 to obtain the model information and print setting information about the target printer 200, and provide the UI based on the information. After the completion of the installation of the print extension application 1052, the user can use detailed print setting changes.

In the present exemplary embodiment, after the generation of the print queue on the client computer 100, the client computer 100 accesses the printer driver distribution service 300 and obtains the driver extension package 303. Alternatively, the client computer 100 may obtain information about the extended print queue from the cloud print service 500 without extending the print queue on the client computer 100. In such a case, the client computer 100 omits the operations in steps S614 to S616. The client computer 100 may obtain the information about the extended print queue from the cloud print service 500 and then perform the processing of steps S614 to S616.

Next, a case where the user operates the client computer 100 to perform printing via the cloud print service 500 will be described.

Figure 8A:
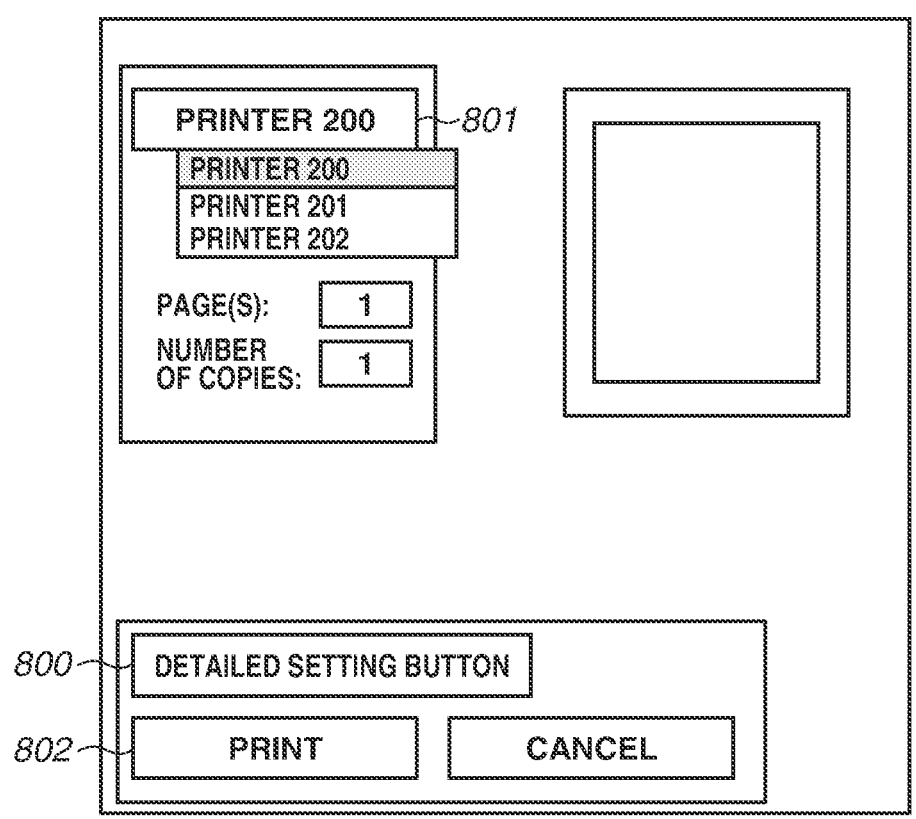
FIG. 8A is a diagram illustrating an example of a user interface (UI) for changing print settings according to the present exemplary embodiment.

In a case where the user uses cloud printing, the user issues a print instruction from the application 1051 on the client computer 100. As a specific example, the user selects a "print" button from a file menu of the application 1051. In accordance with the print instruction from the user, the application 1051 instructs the OS 1053 to display a print common dialog (print setting screen provided by the OS 1053) illustrated in FIG. 8A. In response to receiving the instruction from the application 1051, the OS 1053 displays the print common dialog. The print common dialog displayed by the OS 1053 is capable of listing printers of which print queues are generated on the client computer 100, specifying pages to be printed, and setting the number of copies. An area 801 displays the names of the print queues generated on the client computer 100. The area 801 displays the names of the print queues of the printers that can be used for printing via the cloud print service 500, in addition to that of the print queue of the printer 200 connected to the client computer 100 via the intranet. On the print common dialog, the user can only make settings that can be made in using any printer. Examples of such settings include page specification and the setting of the number of copies. The print common dialog illustrated in FIG. 8A may be capable of making a two-sided printing setting and a color mode setting that are standard setting items defined by the IPP.

For the user to make print settings that are unable to be made on the print common dialog, the user selects the print queue of the printer to be set from the print common dialog, and selects a detailed setting button (object) 800 displayed on the same screen. If the user selects the detailed setting button 800, the installed print extension application 1052 is activated to display a print setting screen illustrated in FIG. 8B. The print setting screen provided by the print extension application 1052 enables print settings that are unable to be made on the print common dialog to be made. Examples of such print settings include image processing settings, such as density and tint, a setting about whether a stamp function is enabled, and settings about punching positions and stapling positions.

The print setting screen provided by the print extension application 1052 will now be described with reference to FIG. 8B.

If the user selects the detailed setting button 800 on the print common dialog, the print extension application 1052 obtains the device capability information associated with the print queue on the client computer 100 generated in the cloud print service 500.

Figure 8B:
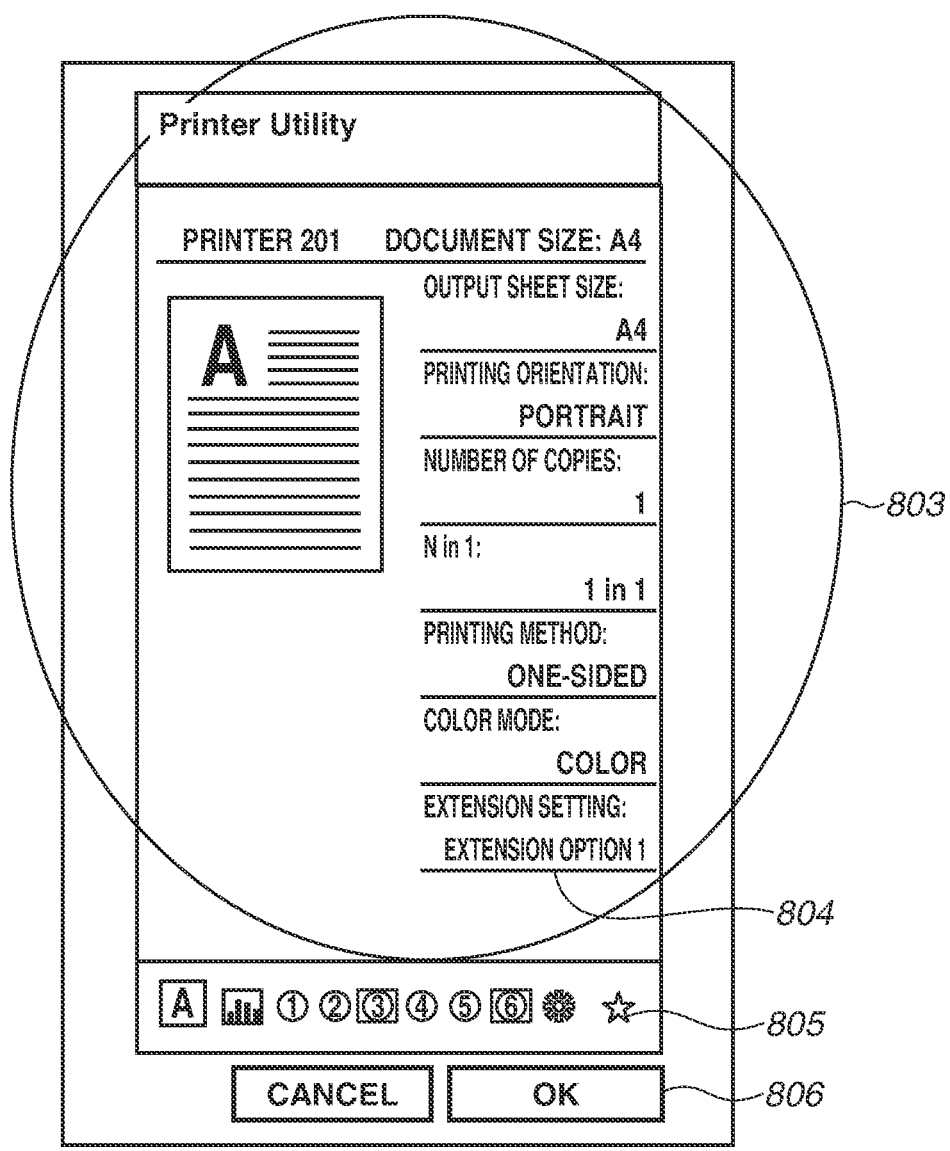
FIG. 8B is a diagram illustrating an example of a print setting screen displayed based on capability information about a printer according to the present exemplary embodiment.

The executable file section 10522 generates the print setting screen illustrated in FIG. 8B based on the obtained device capability information. In a print setting section 803, print settings can be changed based on the device capability information associated with the print queue. An extension setting 804 is an operation section generated based on device capability information extended by the driver extension package 303. An area 805 is intended to switch the displayed screen and change items to be set. If an OK button 806 is pressed, the setting information is confirmed. The confirmed setting information is passed to the OS 1053.

If the user selects a print button 802 on the print common dialog, the image data, the print settings made on the print common dialog, and the print settings made by the print extension application 1052 are transmitted to the print queue. If the print queue set in the area 801 is that of a printer registered in the cloud print service 500, the client computer 100 transmits the image data and the print settings to the corresponding print queue of the cloud print service 500.

Next, processing when the user operates the printer 200 to perform printing will be described. When the user logs in to the printer 200, the printer 200 transmits an acquisition request for bibliographic information about print jobs registered in the print queue of the cloud print service 500 to the cloud print service 500. The bibliographic information to be obtained here is information used to provide a UI display of the printer 200. Examples include the file name of image data, the color mode, the number of copies to be printed, and the date and time of generation of a print job.

The cloud print service 500 generates a printable job list from the bibliographic information about the print jobs stored in the print queue. The cloud print service 500 transmits the generated printable job list to the printer 200. In response to receiving the printable job list transmitted from the cloud print service 500, the printer 200 displays the printable job list on the operation panel 111. FIG. 7 illustrates an example of the operation panel 111 displaying the printable job list received from the cloud print service 500. Print jobs "aaa.doc" to "jjj.pdf" are registered in the cloud print service 500. The user selects a desired print job on the operation panel 111, and presses a print button 701 to execute printing. The printer 200 that has received the execution of printing issues an acquisition request for the print job to the cloud print service 500. The acquisition request includes the ID of the print job to be obtained, i.e., a print job ID. Processing illustrated in FIG. 10 is then performed to implement the printing.

Figure 10:
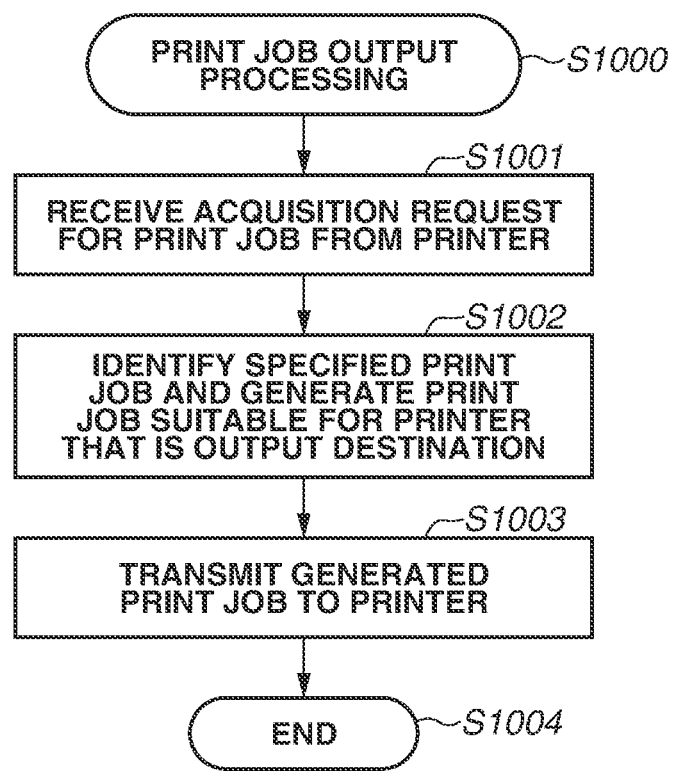
FIG. 10 is a flowchart of printing by the cloud print service according to the present exemplary embodiment.

FIG. 10 is a flowchart illustrating processing to be performed by the cloud print service 500 in a case where the cloud print service 500 receives an acquisition request for a print job from the printer 200 according to the present exemplary embodiment. This processing is performed by the processing units of the cloud print service 500 unless otherwise specified. In step S1001, the print job management unit 505 initially receives the acquisition request for the print job (including the print job ID of the print job to be output) from the printer 200.

In step S1002, the print job management unit 505 that has received the acquisition request identifies the specified print job in the print job storage area 511. The print job management unit 505 passes the identified print job to the print job generation unit 506 to generate a print job suitable for the printer 200 that is the output destination.

In step S1003, the print job management unit 505 obtains the generated print job from the print job generation unit 506, and transmits the print job to the print-requesting printer 200.

In the present exemplary embodiment, the user operates the printer 200, and the printer 200 obtains the selected print job from the cloud print service 500. Alternatively, the printer 200 may access the cloud print service 500 on a regular basis, and obtain the print jobs managed in association with the print queue of the printer 200 from the cloud print service 500.

Through such processing, the print jobs registered in the cloud print service 500 are executed.

Details of the processing where the cloud print service 500 extends the print queue illustrated in FIG. 4 will now be described.

Figure 12:
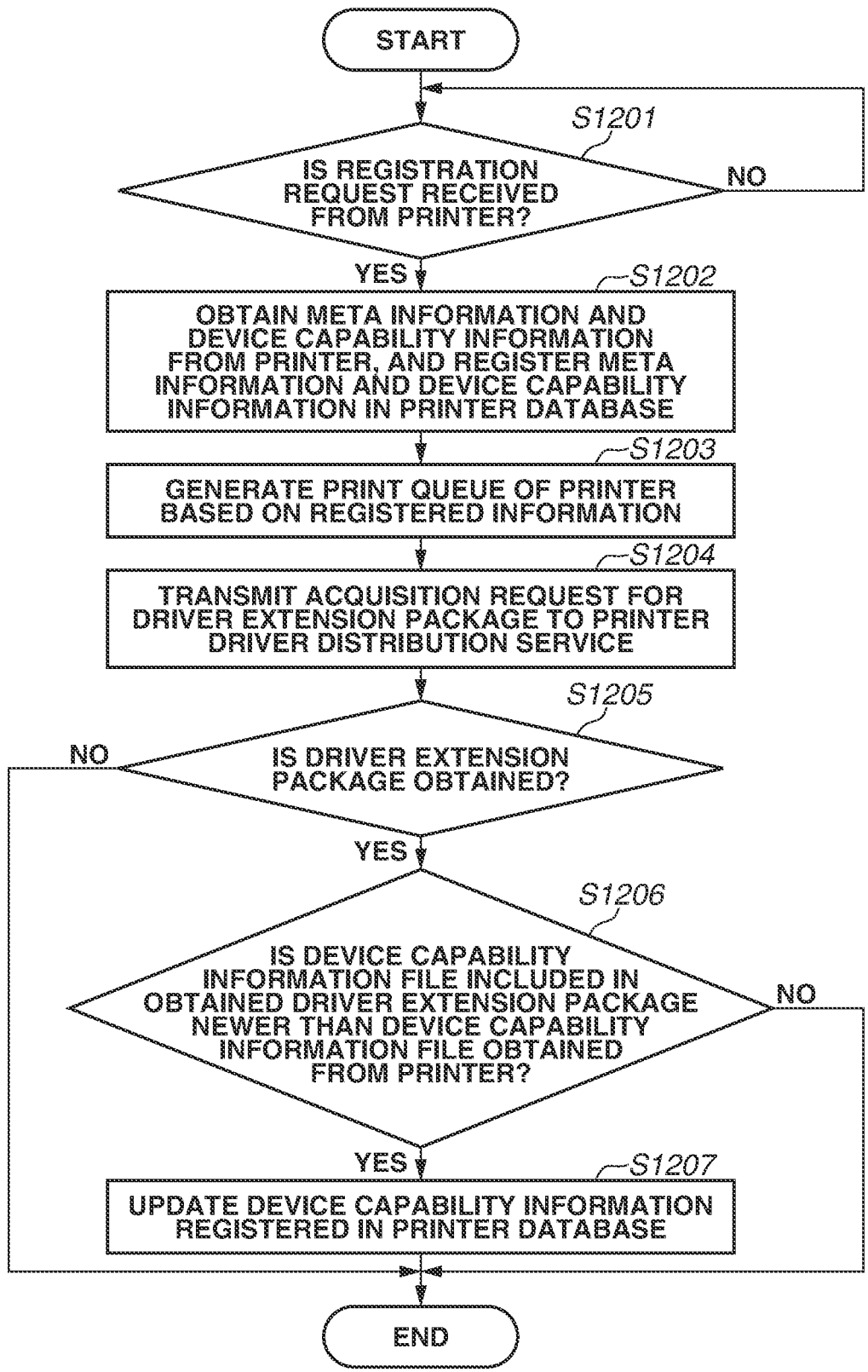
FIG. 12 is a flowchart illustrating processing where the cloud print service obtains a driver extension package according to the present exemplary embodiment.

FIG. 12 is a flowchart illustrating processing where the printer 200 is registered in the cloud print service 500 and the cloud print service 500 extends the print queue. The processing illustrated in FIG. 12 is implemented by execution of programs by the CPU(s) of one or a plurality of information processing apparatuses constituting the cloud print service 500.

In step S1201, the printer registration unit 501 determines whether a registration request is received from the printer 200. If a registration request is received from the printer 200 (YES in step S1201), the processing proceeds to step S1202. If no registration request is received from the printer 200 (NO in step S1201), the processing returns to step S1201.

In step S1202, the printer registration unit 501 obtains meta information and device capability information from the printer 200, and registers the meta information and the device capability information in the printer database 510. The meta information includes the HWID and COID of the printer 200. The meta information obtained from the printer 200 also includes the version of the file of the device capability information provided by the printer 200. The device capability information obtained from the printer 200 includes information about whether two-sided printing is supported, whether monochrome printing is supported, whether color printing is supported, and the orientation of sheets used in printing. Such capability information is standardized by the IPP. The printer registration unit 501 registers the obtained meta information and device capability information in the printer database 510. In step S1202, the cloud print service 500 may further receive hardware configuration information about the printer 200 from the printer 200.

In step S1203, the print queue generation unit 502 obtains the meta information and the device capability information from the printer registration unit 501, and generates the print queue of the printer 200.

In step S1204, the printer registration unit 501 transmits an acquisition request for a driver extension package 303 to the printer driver distribution service 300. The printer registration unit 501 transmits the HWID and COID included in the meta information obtained from the printer 200 along with the acquisition request for a driver extension package 303. While in the present exemplary embodiment both the HWID and COID are transmitted to the printer driver distribution service 300, only either one may be transmitted to the printer driver distribution service 300.

In step S1205, the printer registration unit 501 determines whether a driver extension package 303 is obtained from the printer driver distribution service 300. For example, if the cloud print service 500 receives a response indicating that there is no corresponding driver extension package 303 from the printer driver distribution service 300, the printer registration unit 501 determines that no driver extension package 303 is obtained. If a predetermined time elapses from the transmission of the acquisition request for a driver extension package 303 without obtaining a driver extension package 303, the printer registration unit 501 may determine that no driver extension package 303 is obtained. If the printer registration unit 501 determines that no driver extension package 303 is obtained (NO in step S1205), the flowchart illustrated in FIG. 12 ends.

If the printer registration unit 501 determines that a driver extension package 303 is obtained (YES in step S1205), the processing proceeds to step S1206.

In step S1206, the printer registration unit 501 determines whether the device capability information file included in the driver extension package 303 obtained from the printer driver distribution service 300 is newer than the device capability information file obtained from the printer 200. The printer registration unit 501 compares the version of the device capability information file obtained from the printer driver distribution service 300 with that of the device capability information file obtained from the printer 200. If the device capability information file obtained from the printer driver distribution service 300 is newer than the device capability information file obtained from the printer 200 (YES in step S1206), the processing proceeds to step S1207. Whether or not the device capability information file obtained from the printer driver distribution service 300 is newer than the device capability information file obtained from the printer 200 may be determined based on factors other than the file versions. For example, the printer registration unit 501 may compare the date of generation of the device capability information file obtained from the printer 200 with that of the device capability information file obtained from the printer driver distribution service 300.

In step S1207, the printer registration unit 501 updates the device capability information registered in the printer database 510 with the device capability information file obtained from the printer driver distribution service 300. The printer registration unit 501 further transmits the device capability information to the print queue generation unit 502 to update the device capability information corresponding the print queue. The printer registration unit 501 overwrites the device capability information in the printer database 510 with the device capability information included in the driver extension package. Alternatively, the printer registration unit 501 may add pieces of device capability information that are included in the driver extension package 303 and not included in the device capability information obtained from the printer 200 to the device capability information registered in the printer database 510. Similarly, the print queue generation unit 502 may overwrite the device capability information associated with the print queue with the device capability information included in the driver extension package 303. The print queue generation unit 502 may add pieces of device capability information that are not included in the device capability information obtained from the printer 200. If the hardware configuration information about the printer 200 is received in step S1202, the printer database 510 may be updated with functions executable by the printer 200 as device capability information including the hardware configuration information.

Through the processing illustrated in FIG. 12, newer device capability information between the device capability information obtained from the printer 200 and the device capability information included in the driver extension package 303 can be registered in the cloud print service 500. In FIG. 12, the newer device capability information between the device capability information obtained from the printer 200 and the device capability information obtained from the printer driver distribution service 300 is described to be registered in the cloud print service 500. Alternatively, the device capability information included in the driver extension package 303 obtained from the printer driver distribution service 300 may always be registered in the cloud print service 500.

Next, details of the processing for installing the print extension application 1052 on the client computer 100 illustrated in FIG. 6 will be described.

FIG. 13 is a flowchart illustrating the processing where the client computer 100 installs the print extension application 1052. The processing steps are implemented by the CPU 101 of the client computer 100 executing a program. In the processing illustrated in FIG. 13, the user operates the client computer 100 and the client computer 100 starts to search for a usable printer.

In step S1301, the CPU 101 transmits an acquisition request for a list of printers registered in the cloud print service 500 to the cloud print service 500. The CPU 101 accesses an already-registered URL of the cloud print service 500 and obtains the information about the printers usable by the user of the client computer 100. In step S1301, the client computer 100 accesses the cloud print service 500 by using an access token obtained in advance. If there is no access token, the client computer 100 displays a screen for prompting input of an ID and password for logging in to the cloud print service 500. The client computer 100 requests authentication using the ID and password input by the user, and obtains an access token.

In step S1302, the CPU 101 determines whether a list of printers is received from the cloud print service 500. If a list of printers is not successfully obtained (NO in step S1302), the processing illustrated in FIG. 13 ends. If a list of printers is successfully received (YES in step S1302), the processing proceeds to step S1303.

In step S1303, the CPU 101 displays information about the received list of printers and accepts selection of a printer by the user.

In step S1304, the CPU 101 transmits an acquisition request for meta information and device capability information about the selected printer to the cloud print service 500. The CPU 101 obtains the meta information and the device capability information about the selected printer from the cloud print service 500, and generates a print queue on the client computer 100.

In step S1305, the CPU 101 transmits the HWID and COID included in the obtained meta information and an acquisition request for a driver extension package 303 to the printer driver distribution service 300. The CPU 101 then obtains a driver extension package 303 matching the transmitted HWID or COID from the printer driver distribution service 300. In step S1305, the CPU 101 may transmit only either one of the HWID and COID to the printer driver distribution service 300.

In step S1306, the CPU 101 determines whether the driver information section 304 of the obtained driver extension package 303 includes an application ID that is ID information assigned to a print extension application 1052. If no application ID is included (NO in step S1306), the processing illustrated in FIG. 13 ends.

If an application ID is included in the driver extension package 303 (YES in step S1306), the processing proceeds to step S1307. In step S1307, the CPU 101 determines whether the print extension application 1052 identified by the application ID is installed on the client computer 100. If the print extension application 1052 is installed on the client computer 100 (YES in step S1307), the processing proceeds to step S1308. In step S1308, the CPU 101 determines whether the installed print extension application 1052 is the latest one. In step S1308, the CPU 101 accesses the print extension application distribution service 400 to obtain version information about the print extension application 1052 being distributed, and compares the version information with the version of the already-installed print extension application 1052. If the version of the installed print extension application 1052 is the same as that of the print extension application 1052 being distributed, the CPU 101 determines that the installed print extension application 1052 is the latest one (YES in step S1308), and the processing illustrated in FIG. 13 ends. If the version of the print extension application 1052 being distributed is newer than that of the installed print extension application 1052 (NO in step S1308), the processing proceeds to step S1309. In the present exemplary embodiment, whether or not the installed print extension application 1052 is the latest one is determined based on the version information about the print extension application 1052. Alternatively, whether or not the print extension application 1052 installed on the client computer 100 is the latest one may be determined based on the start date and time of distribution of the print extension application 1052.

In step S1309, the CPU 101 inquires the user whether to install the print extension application 1052 distributed by the print extension application distribution service 400. If the print extension application 1052 is not to be installed (NO in step S1309), the processing illustrated in FIG. 13 ends. If the print extension application 1052 is to be installed (YES in step S1309), the processing proceeds to step S1310. In step S1310, the CPU 101 obtains the print extension application 1052 identified by the application ID included in the driver extension package 303 from the print extension application distribution service 400, and installs the print extension application 1052 on the client computer 100. In the present exemplary embodiment, whether to install the print extension application 1052 is inquired of the user. Alternatively, the CPU 101 may perform the processing of step S1310 without inquiring the user in step S1309.

In FIG. 13, the client computer 100 obtains the driver extension package 303 from the printer driver distribution service 300 in step S1305. Alternatively, the client computer 100 may obtain information about the driver extension package 303 from the cloud print service 500 and perform the operation of step S1306 and the operations in the subsequent steps based on the information about the driver extension package 303.

By performing the processing illustrated in FIG. 13, the print extension application 1052 capable of making vendor-specific print settings in addition to standard print settings can be installed on the client computer 100.

Figure 11:
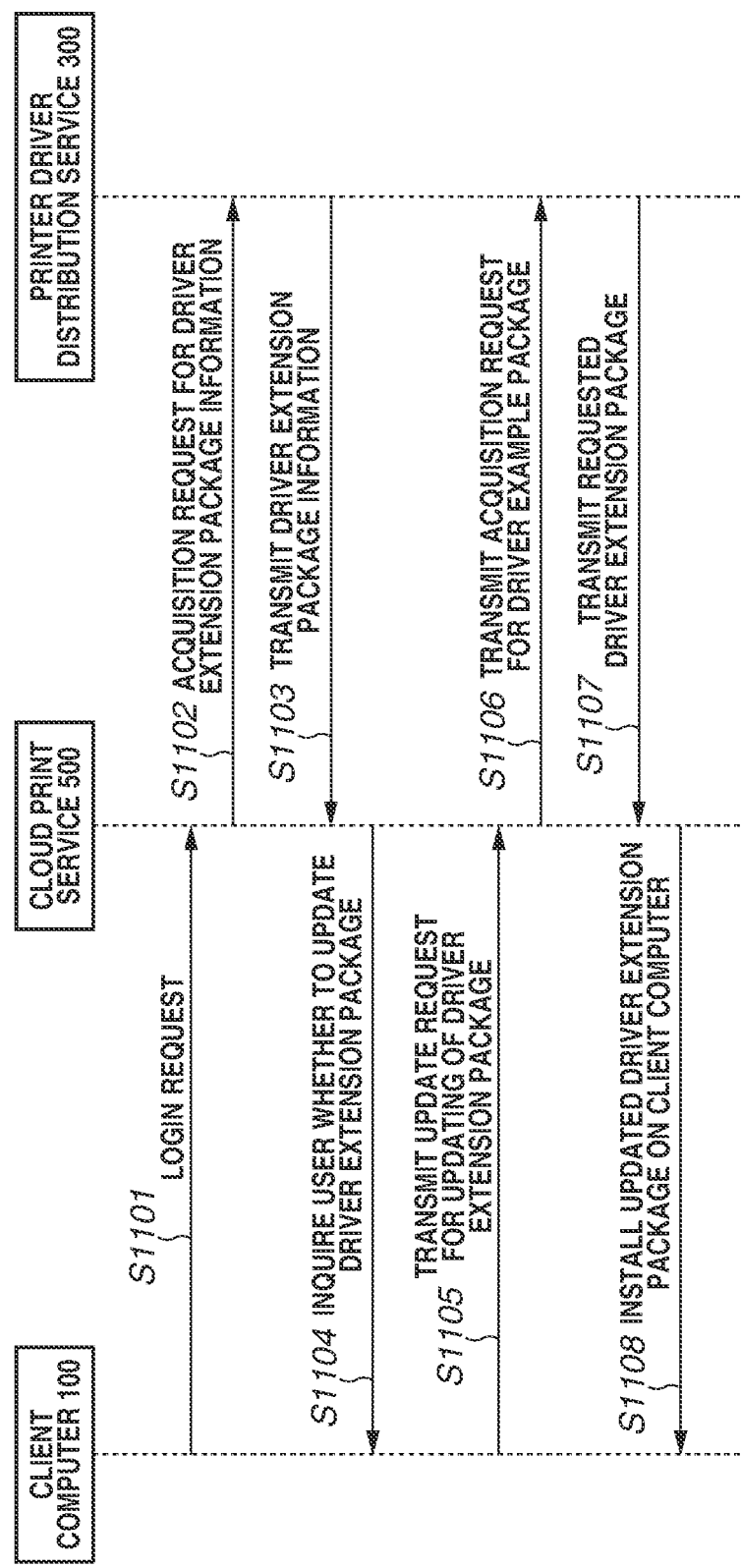
FIG. 11 is a diagram illustrating an example of a sequence for updating a driver extension package according to the present exemplary embodiment.

Finally, processing when the driver extension package 303 registered in the printer driver database 310 of the printer driver distribution service 300 is updated will be described. FIG. 11 is a sequence diagram illustrating the processing when the driver extension package 303 registered in the printer driver distribution service 300 is updated.

The driver extension package 303 is updated by the printer driver registration unit 301 of the printer driver distribution service 300 registering a new driver extension package 303 distributed by the vendor into printer into the printer driver database 310. If the driver extension package 303 registered in the printer driver distribution service 300 is updated, the driver extension package 303 corresponding to the print queue registered in the cloud print service 500 is desirably updated as well. The driver extension package 303 registered in the cloud print service 500 is thus updated through the following processing.

In step S1101, the client computer 100 accesses the cloud print service 500 and transmits a login request to the cloud print service 500. The user accesses the cloud print service 500 and inputs the user ID and password to log in to the cloud print service 500. The cloud print service 500 performs user authentication based on the input user ID and password.

If the user authentication is successful, then in step S1102, the cloud print service 500 transmits an acquisition request for driver extension package information to the printer driver distribution service 300 based on the printer information associated with the user. Here, the cloud print service 500 transmits the HWID and COID of the printer 200 associated with the login user to the printer driver distribution service 300. In step S1102, the cloud print service 500 may transmit either one of the HWID and COID. In step S1103, the printer driver distribution service 300 transmits driver extension package information about the driver extension package 303 associated with the HWID received from the cloud print service 500 to the cloud print service 500. Here, the printer driver distribution service 300 transmits the driver extension package information about the driver extension package 303 stored in the printer driver database 310. The driver extension package information transmitted here includes the version information about the driver extension package 303 and latest update date and time information.

The cloud print service 500 compares the received driver extension package information with driver extension package information stored in association with the print queue, and determines whether to update the driver extension package 303. For example, the cloud print service 500 compares the version of the driver extension package 303 registered in the printer database 510 with the version information about the driver extension package 303 received from the printer driver distribution service 300. If the version information received from the printer driver distribution service 300 has a value indicating a newer version, the processing proceeds to step S1104. The cloud print service 500 may compare the date and time of update of the driver extension package 303 received from the printer driver distribution service 300 with the date and time of update of the driver extension package 303 stored in the printer database 510. If the date and time of update received from the printer driver distribution service 300 is later, the processing proceeds to step S1104. If the driver extension package 303 registered in the cloud print service 500 is the latest one, the sequence illustrated in FIG. 11 ends without the processing of step S1104 or the subsequent steps.

In step S1104, the cloud print service 500 causes the client computer 100 to display a screen for inquiring the user whether to update the driver extension package 303 that is desirably updated. For example, in step S1104, the client computer 100 lists information about printers of which driver extension packages 303 are desirably updated, and prompts the user to select a printer for which the driver extension package 303 is to be updated.

If the user requests the update of the driver extension package 303, then in step S1105, the client computer 100 transmits an update request for updating of the driver extension package 303 of the user-selected printer to the cloud print service 500.

In step S1106, the cloud print service 500 transmits an acquisition request for the driver extension package 303 to the printer driver distribution service 300. In step S1106, the cloud print service 500 transmits the HWID and COID of the printer instructed to be updated by the user to the printer driver distribution service 300. In step S1106, the cloud print service 500 may transmit only either one of the HWID and COID to the printer driver distribution service 300.

In step S1107, the printer driver distribution service 300 transmits the driver extension package 303 identified based on the received HWID to the cloud print service 500. The cloud print service 500 updates the driver extension package 303 previously stored in association with the printer information with the received driver extension package 303. The driver extension package 303 registered in the cloud print service 500 can thus be updated with the latest one registered in the printer driver distribution service 300. In the foregoing example, the driver extension package 303 is updated based on an update instruction provided by the user. Alternatively, if the driver extension package 303 to be distributed by the printer driver distribution service 300 is updated, the cloud print service 500 may register the new driver extension package 303 without inquiring the user.

In step S1108, the cloud print service 500 installs the updated driver extension package 303 on the client computer 100. The client computer 100 obtains the updated driver extension package 303 from the cloud print service 500, and updates the information about the driver extension package 303 stored in the client computer 100.

In FIG. 11, the cloud print service 500 issues the acquisition request for the driver extension package information registered in the printer driver distribution service 300 in step S1102 after the login of the user to the cloud print service 500. Alternatively, the cloud print service 500 may transmit the acquisition request for the driver extension package information to the printer driver distribution service 300 at predetermined time intervals or at a fixed date and time.

In FIG. 11, the processing of step S1102 is performed at timing when the user has just logged in. However, the operation in step S1102 and the operations in the subsequent steps may be performed if the user logged in to the cloud print service 500 has the authority to manage the printer information in the cloud print service 500.

By performing the foregoing processing, the print extension application 1052 for making print settings that are unable to be made on a standard print setting screen provided by the cloud print service 500 or the OS 1053 can be installed on the client computer 100. The use of the application identification information included in the driver extension package 303 distributed from the printer driver distribution service 300 enables installation of the print extension application 1052 without the user manually searching for the print extension application 1052.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, an application corresponding to a printing apparatus registered in a cloud print service can be installed on an information processing apparatus used by a user without the user searching for the application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-015844, filed Jan. 31, 2020, which is hereby incorporated by reference herein in its entirety.

What is claimed is:

1. An information processing apparatus configured to communicate with a first server system that provides a cloud print service, the first server system being configured to store a printer identifier of a printer and first capability information regarding a capability of the printer, the information processing apparatus comprising:
 a controller configured to:
  obtain the printer identifier and the first capability information from the first server system, wherein the first capability information is information related to a function of the printer, wherein the function conforms to Internet Printing Protocol, and wherein the function included in the first capability information is able to be set on a first print setting screen provided by an operating system of the information processing apparatus;
  store information of a printer driver dedicated to the cloud print service and the printer identifier in association with a print queue;
  obtain a print setting application corresponding to an application identifier based on the printer identifier;
  obtain second capability information regarding a capability of the printer, wherein the second capability information is different from the first capability information and is obtained from a second server system;
  cause a display to display a second print setting screen provided by the print setting application based on both the first capability information and the second capability information in a situation that the print queue is selected, wherein the second print setting screen includes an object for setting a print setting value that is not able to be set on the first print setting screen, and wherein the second print setting screen is displayed when a user selects a detailed setting button displayed on the first print setting screen; and
  transmit image data to be printed and a print setting value set via the second print setting screen to the first server system.

2. The information processing apparatus according to claim 1, wherein the printer identifier is an identifier of a model of the printer.

3. The information processing apparatus according to claim 1, wherein the print setting application is obtained from a third server system.

4. The information processing apparatus according to claim 3, wherein the controller updates the print setting application, in a case where the print setting application has been stored in the information processing apparatus and the print setting application that has been updated is stored in the third server system.

5. The information processing apparatus according to claim 1, wherein the controller notifies the first server system of a destination of print data.

6. The information processing apparatus according to claim 1, wherein the printer transmits a registration request to the first server system and the first server system stores the printer identifier based on the registration request.

7. The information processing apparatus according to claim 1, wherein the controller is further configured to:
store the application identifier in association with the print queue without obtaining the print setting application in a case where the information processing apparatus stores the print setting application that is specified based on the application identifier corresponding to the printer identifier.

8. The information processing apparatus according to claim 1, wherein the second capability information is information related to a function of the printer, and the function included in the second capability information is not able to be set on the print setting screen provided by the operating system.

9. A method for controlling an information processing apparatus configured to communicate with a first server system that provides a cloud print service, the first server system being configured to store a printer identifier of a printer and first capability information regarding a capability of the printer, the method comprising:
obtaining the printer identifier and the first capability information from the first server system, wherein the first capability information is information related to a function of the printer, wherein the function conforms to Internet Printing Protocol, and wherein the function included in the first capability information is able to be set on a first print setting screen provided by an operating system of the information processing apparatus;
storing information of a printer driver dedicated to the cloud print service and the printer identifier in association with a print queue;
obtaining a print setting application corresponding to an application identifier based on the printer identifier;
obtaining second capability information regarding a capability of the printer, wherein the second capability information is different from the first capability information and is obtained from a second server system;
causing a display to display a second print setting screen provided by the print setting application based on both the first capability information and the second capability information in a situation that the print queue is selected, wherein the second print setting screen includes an object for setting a print setting value that is not able to be set on the first print setting screen, and wherein the second print setting screen is displayed when a user selects a detailed setting button displayed on the first print setting screen; and
transmitting image data to be printed and a print setting value set via the second print setting screen to the first server system.

10. The method according to claim 9, wherein the second capability information is information related to a function of the printer, and
wherein the function included in the second capability information is not able to be set on the print setting screen provided by the operating system.

11. The method according to claim 9, wherein the first capability information indicates that the printer supports color printing.

12. The method according to claim 9, wherein the second capability information indicates that the printer supports a needleless stapling function.

13. The method according to claim 9, further comprising:
storing the first capability information in association with the print queue.

14. The method according to claim 13, wherein the second capability information is obtained in a situation that the first capability information is stored in association with the print queue.

15. A non-transitory computer-readable storage medium storing a program for causing a computer to perform a method for controlling an information processing apparatus configured to communicate with a first server system that provides a cloud print service, the first server system being configured to store a printer identifier of a printer and first capability information regarding a capability of the printer, the method comprising:
obtaining the printer identifier and the first capability information from the first server system, wherein the first capability information is information related to a function of the printer, wherein the function conforms to Internet Printing Protocol, and wherein the function included in the first capability information is able to be set on a first print setting screen provided by an operating system of the information processing apparatus;
storing information of a printer driver dedicated to the cloud print service and the printer identifier in association with a print queue;
obtaining a print setting application corresponding to an application identifier based on the printer identifier;
obtaining second capability information regarding a capability of the printer, wherein the second capability information is different from the first capability information and is obtained from a second server system;
causing a display to display a second print setting screen provided by the print setting application based on both the first capability information and the second capability information in a situation that the print queue is selected, wherein the second print setting screen includes an object for setting a print setting value that is not able to be set on the first print setting screen, and wherein the second print setting screen is displayed when a user selects a detailed setting button displayed on the first print setting screen; and
transmitting image data to be printed and a print setting value set via the second print setting screen to the first server system.

16. The non-transitory computer-readable storage medium according to claim 15, wherein the second capability information is information related to a function of the printer, and wherein the function included in the second capability information is not able to be set on the print setting screen provided by the operating system.

17. A printing system including an information processing apparatus that transmits print data and a first server system that receives the transmitted print data and transmits the print data to a printer, the first server system being configured to:
store a printer identifier of the printer and first capability information regarding a capability of the printer; and
transmit the printer identifier and the first capability information to the information processing apparatus,
the information processing apparatus being configured to:
obtain the printer identifier and the first capability information from the first server system, wherein the first capability information is information related to a function of the printer, wherein the function conforms to Internet Printing Protocol, and wherein the function included in the first capability information is able to be set on a first print setting screen provided by an operating system of the information processing apparatus;
store information of a printer driver dedicated to a cloud print service and the printer identifier in association with a print queue;
obtain a print setting application identified by an application identifier corresponding to the stored printer identifier;
obtain second capability information regarding a capability of the printer, wherein the second capability information is different from the first capability information and is obtained from a second server system;
store the application identifier in association with the print queue;
display a second print setting screen provided by the print setting application based on both the first capability information and the second capability information in a situation that the print queue is selected, wherein the second print setting screen includes an object for setting a print setting value that is not able to be set on the first print setting screen, and wherein the second print setting screen is displayed when a user selects a detailed setting button displayed on the first print setting screen; and
transmit the print data generated based on a print setting value set via the second print setting screen to the first server system.

18. The printing system according to claim 17, wherein the print setting value set via the second print setting screen is not able to be set via the first print setting screen.

19. The printing system according to claim 17, wherein the printer identifier is an identifier of a model of the printer.

20. The printing system according to claim 17, wherein the information processing apparatus is further configured to:
store the application identifier in association with the print queue without obtaining the print setting application in a case where the information processing apparatus stores the print setting application that is specified based on the application identifier corresponding to the printer identifier.

21. The printing system according to claim 17, wherein the second capability information is information related to a function of the printer, and
wherein the function included in the second capability information is not able to be set on the print setting screen provided by the operating system.

* * * * *